Patented Dec. 26, 1933

1,940,824

UNITED STATES PATENT OFFICE 1,940,824

RUBBER COMPOSITION AND METHOD OF PRESERVING RUBBER

Arthur W. Sloan, Akron, Ohio, assignor to The B. F. Goodrich Company, New York, N. Y., a corporation of New York No Drawing. Application March 7, 1931
Serial No. 521,010

38 Claims. (Cl. 18—50)

This invention relates to the art of rubber manufacture, and particularly to the preparation of rubber compositions which resist the deterioration due to aging or to exposure to the atmosphere. It has long been known that such deterioration can be greatly retarded by treating the rubber either before or after vulcanization with certain substances known as age-resisters or anti-oxidants. The chief object of this invention, then, is to provide a new and superior class of anti-oxidants for rubber.

The substances which are employed as anti-oxidants according to this invention are secondary amino derivatives of hydrocarbons containing two or more aromatic ring structures attached to a central aliphatic nucleus. These compounds may, if desired, contain other basic or neutral substituents including the radicals of ethers, alcohols, primary and tertiary amines, etc., but strongly acidic substituent groups such as carboxyl or sulphonic acid groups which have the effect of greatly retarding vulcanization, and other groups containing doubly bound oxygen, nitrogen, sulphur, or other inorganic elements, should in general be avoided because of their reduced or even negative anti-oxidant power or because of their undesirably strong effect on the vulcanization of the rubber.

For example, the following substances are typical members of the class of substances outlined above: p-phenylamino tetraphenyl methane, tolyl p-amino tetraphenylmethane, naphthyl p-amino tetraphenylmethane, p-biphenyl p-amino tetraphenylmethane, p-phenylamino phenyl tritolyl methane, p-phenylamino phenyl tri-biphenyl methane, biphenyl-amino tetrabiphenyl methane, p-phenylamino phenyl trianisyl methane, p-phenylamino phenyl trinaphthyl methane, p-naphthylamino phenyl trinaphthyl methane, p-benzylamino tetraphenylmethane, p-isopropylamino tetraphenylmethane, diphenyl p, p' diamino diphenyl dimethyl methane, triphenyl triamino triphenyl methane, diphenyl diamino diphenyl carbinol, p-phenylamino p'dimethylamino diphenylmethane, p-phenylamino p'amino diphenylmethane, dinaphthyl diamino diphenylmethane, mononaphthyl diamino diphenylmethane, diphenyl diamino diphenylmethane, diphenyl diamino triphenylmethane, dibenzyl diamino diphenyl methane, diethyl diamino diphenyl methane, p, p' di-triphenylmethyl diphenyl ethylene diamine, diphenyl p, p' diamino dibenzyl, p-triphenylmethyl p'phenylamino diphenylamine, p-phenylamino phenyl xylyl methane, triphenylmethyl p-amino tetraphenylmethane, etc.

The compounds enumerated above are readily prepared from inexpensive raw materials by the usual reactions familiar to organic chemists. For example, the diaryl diamino dephenyl methane compounds are readily prepared by condensing aniline hydrochloride first with formaldehyde and then with a phenol or an aromatic amine. The secondary amino tetra-aryl methane compounds are most readily prepared by condensing a triaryl methyl chloride with a diarylamine; although the primary amine may be prepared first, if desired, by reacting the triaryl methyl chloride with aniline hydrochloride, the product being then further reacted with a phenol or amine to give the desired secondary amine.

Any one or a mixture of several of the above-enumerated substances or of these substances with other known anti-oxidants may be incorporated into rubber with good effect on its age-resisting properties. For example from ¼ to 5% of such an anti-oxidant may be mixed with the rubber before vulcanization, the anti-oxidant having substantially no accelerating effect and therefore ordinarily not necessitating an adjustment of vulcanizing conditions. Alternately, the anti-oxidant may be applied to the surface of crude or vulcanized rubber, say in the form of a powder, paste, or solution. Rubber so treated resists the deteriorating influence of age and exposure to the elements far better than similar untreated rubber.

*Example 1.*—As a specific example of one embodiment of the method of this invention, a typical tire tread composition was prepared containing: blended plantation rubbers approximately 100 parts by weight, sulfur 5.5 parts, zinc oxide 30 parts, gas black 40 parts, mineral rubber 10 parts, palm oil 5 parts, and hexamethylene tetramine 0.75 parts. This was divided into portions, one of which was used as a control. To each of the others was added 0.95 parts (0.5% of the weight of the composition) of one of the above-described anti-oxidants. The compositions were thoroughly mixed, and vulcanized in a press for 45 minutes at 145° C. (294° F.) to produce an optimum cure. The relative rates of aging of the vulcanized compositions were compared by measuring their respective tensile strength and elongations before and after aging.

Accelerated aging tests were carried out in the Geer aging oven, in which samples were maintained at a temperature of 70° C. (158° F.) in a constantly renewed stream of air, as well as in the Bierer-Davis bomb, in which other samples were maintained at the same temperature (70° C.) in an atmosphere of oxygen at a pressure of 300 lbs. per sq. in. The results of the tests are given in the table below, in which T indicates ultimate elongation in per cent. of original length.

*Aging tests*

| Anti-oxidant | Before aging | | After 7 days in the Geer oven | | After 48 hours in Bierer-Davis bomb | |
|---|---|---|---|---|---|---|
| | T | E | T | E | T | E |
| None (control) | 3,520 | 633 | 1,920 | 453 | 753 | 297 |
| p-naphthylamino p'-amino diphenyl methane | 3,710 | 637 | 2,460 | 460 | 2,060 | 495 |
| dinaphthyl diamino diphenyl methane | 3,790 | 660 | 2,500 | 507 | 2,130 | 555 |

*Example 2.*—Another rubber composition was prepared and tested as indicated in Example 1 above, except that p-phenylamino tetraphenylmethane was employed as the anti-oxidant. The results of the tests are given in the following table:

*Aging tests*

| Anti-oxidant | Before aging | | After 7 days in the Geer oven | | After 48 hours in Bierer-Davis bomb | |
|---|---|---|---|---|---|---|
| | T | E | T | E | T | E |
| None (control) | 3,424 | 666 | 2,006 | 476 | 864 | 370 |
| p-phenylamino tetraphenyl-methane | 3,365 | 676 | 2,872 | 566 | 2,223 | 590 |

It is evident from the above examples that rubber compositions containing even small proportions of the anti-oxidants of this invention resist deterioration far more effectively than similar untreated compositions. Not only are they outstandingly efficient anti-oxidants, but they do not discolor the rubber goods upon exposure to sunlight, as do all other known classes of effective age-resisters.

Obviously, the practice of this invention is not limited to the specific compositions given above, such compositions being merely illustrative of one manner of employing the anti-oxidants of this invention. The anti-oxidants may be employed in conjunction with other vulcanizing agents than those here specifically disclosed, for this invention is applicable generally to pure rubber or rubber compositions of the most varied nature. Certain of them, particularly the tetra-aryl methane compounds, are exceptionally valuable for use in connection with the so-called "acid cure" because of their comparative inertness with respect to sulphur chloride.

It is to be understood that the term "treating" as employed in the appended claims is used in a generic sense to include either the incorporation of the anti-oxidants into the rubber by milling or similar process, or their addition to the rubber latex before the coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers and like products, whether or not admixed with fillers, pigments, vulcanizing or accelerating agents.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

This application is a continuation in part of my copending application, Serial No. 301,423, filed August 22, 1928.

I claim:

1. The method of preserving rubber which comprises treating rubber with a secondary amino derivative of a hydrocarbon containing at least two aromatic ring structures attached to a central aliphatic nucleus.

2. The method of preserving rubber which comprises treating rubber with a secondary amino derivative of a poly-aryl methane.

3. The method of preserving rubber which comprises treating rubber with a secondary arylamino derivative of a poly-aryl methane.

4. The method of preserving rubber which comprises treating rubber with a secondary amino diphenylmethane.

5. The method of preserving rubber which comprises treating rubber with a secondary aromatic derivative of a diamino diarylmethane.

6. The method of preserving rubber which comprises treating rubber with a naphthylamino diphenylmethane.

7. The method of preserving rubber which comprises treating rubber with a secondary amino tetra-aryl methane.

8. The method of preserving rubber which comprises treating rubber with an arylamino tetraphenyl methane.

9. The method of preserving rubber which comprises vulcanizing rubber in the presence of a secondary amino poly-aryl methane.

10. A composition of matter comprising rubber and a secondary amino derivative of a hydrocarbon containing at least two aromatic ring structures attached to a central aliphatic nucleus.

11. A composition of matter comprising rubber and a secondary amino derivative of a poly-aryl methane.

12. A composition of matter comprising rubber and a secondary arylamino derivative of a poly-aryl methane.

13. A composition of matter comprising rubber and a secondary amino diphenyl methane.

14. A composition of matter comprising rubber and a naphthylamino diphenyl methane.

15. A composition of matter comprising rubber and a secondary amino tetra-aryl methane.

16. A composition of matter comprising rubber and an arylamino tetraphenyl methane.

17. A composition of matter comprising rubber which has been vulcanized in the presence of a secondary amino poly-aryl methane.

18. The process of manufacturing a vulcanized rubber product possessing age resisting characteristics which comprises incorporating with said product prior to vulcanization a reaction product of a hydroxy substituted aromatic hydrocarbon and diamino-diphenyl-methane.

19. The process of manufacturing a vulcanized rubber product possessing age resisting characteristics which comprises incorporating with said product prior to vulcanization a reaction product of a naphthol and diamino-diphenyl-methane.

20. The process of manufacturing a vulcanized rubber product possessing age resisting characteristics which comprises incorporating with said product prior to vulcanization a reaction product of substantially two molar portions of beta naphthol and substantially one molar portion of diamino-diphenyl-methane.

21. The method of preserving rubber which comprises treating rubber with a beta naphthylamino diaryl methane.

22. The method of preserving rubber which comprises treating rubber with a diaryl diamino diaryl methane.

23. The method of preserving rubber which comprises treating rubber with a naphthylamino poly-aryl methane.

24. The method of preserving rubber which comprises treating rubber with a phenylamino-poly-aryl methane.

25. The method of preserving rubber which comprises treating rubber with an arylamino tetra-aryl methane.

26. The method of preserving rubber which comprises treating rubber with phenylamino tetraphenylmethane.

27. The method of preserving rubber which comprises treating rubber with beta dinaphthyl diamino diphenylmethane.

28. The method of preserving rubber which comprises treating rubber with diphenyl diamino diphenylmethane.

29. A composition of matter comprising rubber and a naphthylamino poly-aryl methane.

30. A composition of matter comprising rubber and a beta naphthylamino diarylmethane.

31. A composition of matter comprising rubber and a diaryl diamino diaryl methane.

32. A composition of matter comprising rubber and an arylamino tetra-aryl methane.

33. A composition of matter comprising rubber and a phenylamino poly-aryl methane.

34. A composition of matter comprising rubber and phenylamino tetraphenylmethane.

35. A composition of matter comprising rubber and diphenyl diamino diphenylmethane.

36. A composition of matter comprising rubber and beta dinaphthyl diamino diphenylmethane.

37. The method of preserving rubber which comprises treating rubber with a substance having the general formula

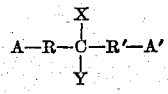

wherein A and A' represent amino groups, at least one of which contains an aromatic hydrocarbon substituent, R and R' represent phenyl groups or substituted phenyl groups, and X and Y represent H or an alkyl or aryl hydrocarbon substituent.

38. A composition comprising rubber and a substance having the general formula

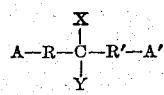

wherein A and A' represent amino groups, at least one of which contains an aromatic hydrocarbon substituent, R and R' represent phenyl groups or substituted phenyl groups, and X and Y represent H or an alkyl or aryl hydrocarbon substituent.

ARTHUR W. SLOAN.